Figure 1:
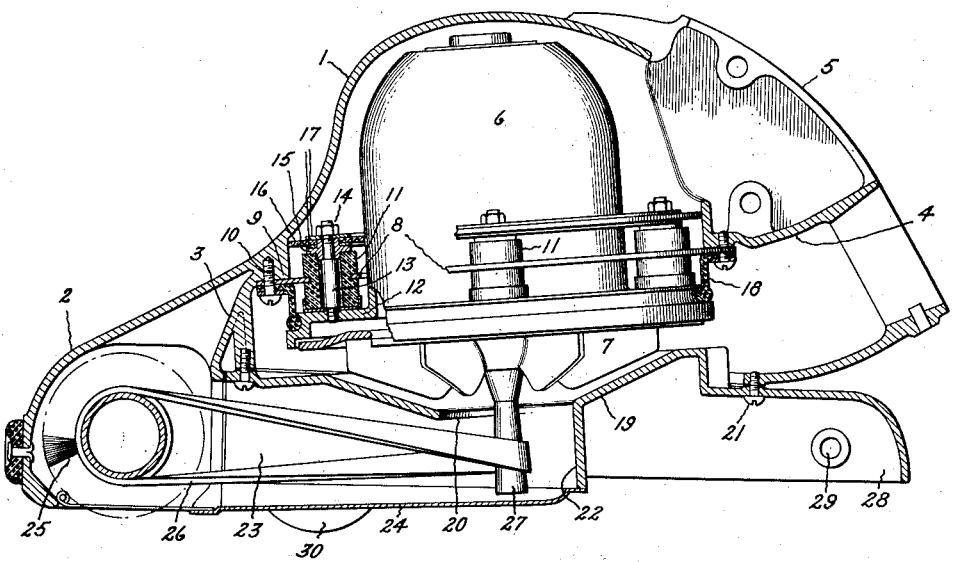
Figure 2:
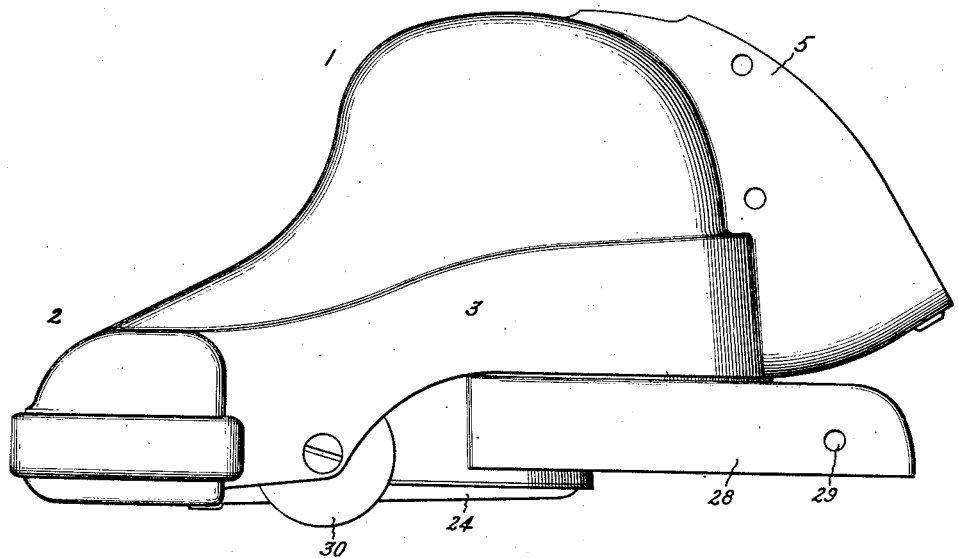

Patented Nov. 8, 1938

2,136,243

UNITED STATES PATENT OFFICE 2,136,243

ELECTRICAL REGULATING APPARATUS FOR RECTIFIERS

Linnie K. Hedding, Swissvale, Pa., assignor to The Union Switch & Signal Company, Swissvale, Pa., a corporation of Pennsylvania Application May 9, 1936, Serial No. 78,822
Renewed November 14, 1936

27 Claims. (Cl. 175—363)

My invention relates to electrical regulating apparatus for rectifiers, and particularly to apparatus for regulating the output of a rectifier in accordance with variations in the load current which is supplied by the rectifier.

More particularly, my present invention relates to apparatus of the type described including a reactive transformer the leakage reactance of which may be controlled by controlling the reluctance of a leakage magnetic circuit which is in shunt with the main magnetic circuit, and the principal object of my invention is the provision of novel and improved means for controlling the reluctance of the leakage path in accordance with changes in the load current in such manner that the load voltage will remain substantially constant within the load range for which the apparatus is designed.

I will describe one form of apparatus embodying my invention and one modification thereof, and will then point out the novel features thereof in claims.

The accompanying drawing is a diagrammatic view showing one form of apparatus embodying my invention.

Referring to the drawing, the reference character L designates a variable load, that is to say, a load requiring varying amounts of current, and the reference character R designates a rectifier for supplying rectified alternating current to the load L. The rectifier R may be of any desired type, but as here shown this rectifier is a full wave rectifier of the well-known copper oxide variety.

Associated with the rectifier R are a regulating transformer T and a condenser C, which transformer and condenser together constitute regulating apparatus for controlling the input voltage impressed on the rectifier in accordance with variations in the load current in such manner that the direct current electromotive force which is impressed on the load will remain substantially constant.

The transformer T comprises a magnetizable four-legged shell type core M provided with a primary winding P disposed on the leg 2; with a secondary winding S disposed on the leg 1; with a main regulating winding A consisting of two coils 11$^a$ and 11$^b$ disposed on the two legs 3 and 4, respectively, and connected in series in such manner that current flowing in these coils will cause a flux to circulate around the closed path formed by the associated legs, but not in any of the paths including the legs 1 and 2; and with an auxiliary regulating winding B consisting of two coils 12$^a$ and 12$^b$ disposed on the two legs 3 and 4, respectively, and connected in series in such manner that current flowing in these coils will cause a flux to circulate around the closed path formed by the associated legs, but not in any of the paths including the legs 1 and 2.

The primary winding P of transformer T is constantly supplied with periodic current from a suitable source here shown as an alternating current generator G, while the secondary winding S is constantly connected with the input terminals 7 and 8 of the rectifier R. The main regulating winding A is connected in series with the load L in an output circuit which may be traced from the one output terminal 9 of the rectifier R through wires 13 and 14, coils 11$^a$ and 11$^b$ of winding A in series, wire 15, load L, and wires 16 and 17 to the other output terminal 10 of rectifier R. The auxiliary regulating winding B is connected in series with the condenser C in a branch or shunt circuit which may be traced from output terminal 9 of rectifier R through wire 13, coils 12$^a$ and 12$^b$ of winding B in series, condenser C, and wire 17 to output terminal 10 of rectifier R.

With the apparatus constructed in the manner described, it will be apparent that the flux which is set up in core M by the alternating current flowing in the primary winding P will divide between a first path, which I shall term the "main" path, and which includes the two legs 1 and 2 in series, and a second path, which I shall term a "shunt" or "leakage" path, and which includes the leg 2 in series with the two legs 3 and 4 in parallel. It will also be apparent that the manner in which the flux divides between the main and leakage paths will depend upon the relative reluctances of these two paths, and that by increasing or decreasing the reluctance of the leakage path the amount of the flux traverses the main path may be increased or decreased. The flux which traverses the main path will, of course, induce an alternating voltage in the secondary winding S, while that which traverses the legs 3 and 4 will induce alternating voltages in the two coils 11$^a$ and 11$^b$ of the main regulating winding A, and also in the two coils 12$^a$ and 12$^b$ of the auxiliary regulating winding B. Due to the manner in which the coils 11$^a$ and 11$^b$ of winding A are connected in series, however, the alternating voltages which are induced in these coils will substantially neutralize each other. The alternating voltages which are induced in the two coils 12$^a$ and 12$^b$ regulating windings being so arranged on said auxiliary magnetic circuit that the fluxes which are set up in said auxiliary circuit when current from said rectifier is flowing both to the load and into the condenser will tend to neutralize each other.

3. In combination, a magnetizable core having a main magnetic circuit and an auxiliary magnetic circuit comprising two parallel paths, a primary and a secondary winding linking said main magnetic circuit, means for supplying said primary winding with alternating current, a rectifier having its input terminals connected with said secondary winding, a first and a second regulating winding each having portions linking each of said two parallel paths of the leakage magnetic circuit in such manner that substantially no alternating voltage is induced in said windings due to flux from the primary winding linking said auxiliary magnetic circuit, a load receiving current from said rectifier, means for energizing said first regulating winding in accordance with the current supplied to said load, a condenser, and a circuit for connecting said condenser with said rectifier through said second regulating winding.

4. In combination, a magnetizable core having a main magnetic circuit and an auxiliary magnetic circuit comprising two parallel paths, a primary and a secondary winding linking said main magnetic circuit, means for supplying said primary winding with alternating current, a rectifier having its input terminals connected with said secondary winding, a first and a second regulating winding each having portions linking each of said two paralel paths of the leakage magnetic circuit in such manner that substantially no alternating voltage is induced in said windings due to flux from the primary winding linking said auxiliary magnetic circuit, a load receiving current from said rectifier, means for energizing said first regulating winding in accordance with the current supplied to said load, a condenser, and a circuit for connecting said condenser with said rectifier through said second regulating winding in such manner that the fluxes which are set up in said two parallel paths when current from the rectifier is flowing both to the load and into the condenser will tend to neutralize each other, whereby when rectified current is flowing both to the load and into the condenser the reactance of said two regulating windings will tend to be neutralized.

5. In combination, a magnetizable core having a main magnetic circuit and an auxiliary magnetic circuit comprising two parallel paths, a primary and a secondary winding linking said main magnetic circuit, means for supplying said primary winding with alternating current, a rectifier having its input terminals connected with said secondary winding, a first and a second regulating winding each having two portions one linking each of said two parallel paths of said leakage magnetic circuit in such manner that the fluxes set up by current flowing in said regulating windings will traverse said two parallel paths but not said main magnetic circuit, a load receiving current from said rectifier, means for connecting said load with the output terminals of said rectifier in series with a first one of said regulating windings, a condenser, and means for connecting said condenser with the output terminals of said rectifier in series with the other regulating winding, said two regulating windings being so disposed that the fluxes which are set up in said two parallel paths by said two regulating windings when rectified current is flowing both to the load and into the condenser will buck each other.

6. In combination, a magnetizable core having a main magnetic circuit and an auxiliary magnetic circuit comprising two parallel paths, a primary and a secondary winding linking said main magnetic circuit, means for supplying said primary winding with alternating current, a rectifier having its input terminals connected with said secondary winding, a first and a second regulating winding each having two portions one linking each of said two parallel paths of said leakage magnetic circuit in such manner that the fluxes set up by current flowing in said regulating windings will traverse said two parallel paths but not said main magnetic circuit, a load receiving current from said rectifier, means for connecting said load with the output terminals of said rectifier in series with a first one of said regulating windings, a condenser, and means for connecting said condenser with the output terminals of said rectifier in series with the other regulating winding, said two regulating windings being so disposed that the fluxes which are set up in said two parallel paths by said two regulating windings when rectified current is flowing both to the load and into the condenser will tend to neutralize each other, whereby when rectified current is flowing both to the load and into the condenser the reactances of said two regulating windings will tend to neutralize each other and will thus permit the charging current which is supplied to the condenser to increase with increases in the load current.

7. In combination, a magnetizable core having a main magnetic circuit and an auxiliary magnetic circuit comprising two parallel paths, a primary and a secondary winding linking said main magnetic circuit, means for supplying said primary winding with alternating current, a rectifier having its input terminals connected with said secondary winding, a first and a second regulating winding each having two portions one linking each of said two parallel paths of said leakage magnetic circuit in such manner that the fluxes set up by current flowing in said regulating windings will traverse said two parallel paths but not said main magnetic circuit and that the alternating voltages which are induced in the two portions of each of said regulating windings due to flux set up by the current supplied to the primary winding linking said two paths will tend to neutralize each other, a variable load, means for connecting said load with the output terminals of said rectifier in series with a first one of said regulating windings, a condenser, and means for connecting said condenser with the output terminals of said rectifier in series with the other regulating winding, said two regulating windings being so disposed that the fluxes which are set up in said two parallel paths by said two regulating windings when rectified current is flowing both to the load and into the condenser will buck each other.

8. In combination, a magnetizable core having a main magnetic circuit and an auxiliary magnetic circuit comprising two parallel paths, a primary and a secondary winding linking said main magnetic circuit, means for supplying said primary winding with alternating current, a rectifier having its input terminals connected with said secondary winding, a first and a second regulating winding each having two portions one linking each of said two parallel paths of said leakage magnetic circuit in such manner that the fluxes set up by current flowing in said regulating windings will traverse said two parallel paths but not said main magnetic circuit and that the alternating voltages which are induced in the two portions of each of said regulating windings due to flux set up by the current supplied to the primary winding linking said two paths will tend to neutralize each other, a variable load, means for connecting said load with the output terminals of said rectifier in series with a first one of said regulating windings, a condenser, and means for connecting said condenser with the output terminals of said rectifier in series with the other regulating windings, said two regulating windings being so disposed that the fluxes which are set up in said two parallel paths by said two regulating windings when rectified current is flowing both to the load and into the condenser will tend to neutralize each other, whereby when rectified current is flowing both to the load and into the condenser the reactances of said two regulating windings will tend to neutralize each other and will thus permit the charging current which is supplied to the condenser to increase with increases in the load current.

9. In combination, a magnetizable core having a magnetic circuit including a first and second parallel legs in series and an auxiliary magnetic circuit comprising said first leg in series with a third and fourth legs in parallel, a primary winding linking said first leg and a secondary winding linking said second leg, means for supplying alternating current to said primary winding, a rectifier having its input terminals connected with said secondary winding, a first regulating winding comprising two coils linking said third and fourth legs respectively and connected in series in such manner that current flowing in said two coils will link said third and fourth legs in series but not said first and second legs and that the alternating voltages which are induced in said two coils due to flux from said primary winding linking said third and fourth legs will neutralize each other, a second regulating winding comprising two coils linking said third and fourth legs respectively and connected in series in such manner that current flowing in said two coils of said second winding will link said third and fourth legs in series but not said first and second legs and that the alternating voltages which are induced in said two coils of said second winding due to flux from said primary winding linking said third and fourth legs will neutralize each other, a variable load, means for connecting said load with the output terminals of said rectifier in series with said first regulating winding, a condenser, and means for connecting said condenser with the output terminals of said rectifier in series with said second regulating winding, said two regulating windings being so disposed that the fluxes which are set up in said third and fourth legs by said windings when current from said rectifier is being supplied both to said load and to said condenser will tend to neutralize each other.

10. In combination, a magnetizable core having a magnetic circuit including a first and second parallel legs in series and an auxiliary magnetic circuit comprising said first leg in series with a third and fourth legs in parallel, a primary winding linking said first leg and a secondary winding linking said second leg, means for supplying alternating current to said primary winding, a rectifier having its input terminals connected with said secondary winding, a first regulating winding comprising two coils linking said third and fourth legs respectively and connected in series in such manner that current flowing in said two coils will traverse said third and fourth legs in series but not said first and second legs and that the alternating voltages which are induced in said two coils due to flux from said primary winding linking said third and fourth legs will neutralize each other, a second regulating winding comprising two coils linking said third and fourth legs respectively and connected in series in such manner that current flowing in said two coils of said second winding will link said third and fourth legs in series but not said first and second legs and that the alternating voltages which are induced in said two coils of said second winding due to flux from said primary winding linking said third and fourth legs will neutralize each other, a variable load, means for connecting said load with the output terminals of said rectifier in series with said first regulating winding, a condenser, means for connecting said condenser with the output terminals of said rectifier in series with said second regulating winding, said two regulating windings being so disposed that the fluxes which are set up in said third and fourth legs by said windings when current from said rectifier is being supplied both to said load and to said condenser will tend to neutralize each other, and an auxiliary source of power connected across the output terminals of said rectifier in a manner to supply current to said load in the event of an interruption in the supply of alternating current to said primary winding.

11. In combination, a variable load, a regulating transformer having a main magnetic circuit and an auxiliary magnetic circuit, a primary winding linking both said magnetic circuits, means for supplying said primary winding with alternating current, a secondary winding linking only said main magnetic circuit, a rectifier having its input terminals connected with said secondary winding, a first regulating winding linking only said auxiliary magnetic circuit, an output circuit for connecting said load with the output terminals of said rectifier in series with said first regulating winding, a second regulating winding linking only said auxiliary magnetic circuit, a condenser, a shunt circuit for connecting said second regulating winding with the output terminals of said rectifier in series with said condenser, and an auxiliary source of power connected across the output terminals of said rectifier in a manner to supply current to said load in the event of an interruption in the supply of alternating current to said primary winding.

12. In combination, a magnetizable core having a main magnetic circuit and an auxiliary magnetic circuit comprising two parallel paths, a primary and a secondary winding linking said main magnetic circuit, means for supplying said primary winding with alternating current, a rectifier having its input terminals connected with said secondary winding, a first and a second regulating winding each having two portions one linking each of said two parallel paths of the leakage magnetic circuit in such manner that any alternating voltages which are induced in the two portions of each of said windings due to flux from the primary winding linking said auxiliary magnetic circuit will neutralize each other, a load receiving current from said rectifier, means for energizing said first regulating winding in accordance with the current supplied to said load, a condenser, a circuit for connecting said condenser with said rectifier through said second regulating winding, and a battery connected with said load in such manner that said battery will supply current to the load in the event that the supply of alternating current to said primary winding is cut off.

13. In combination, a magnetizable core having a main magnetic circuit and an auxiliary magnetic circuit, a primary and a secondary winding linking said main magnetic circuit, means for supplying said primary winding with alternating current, a rectifier energized from said secondary winding, a load receiving current from said rectifier, means for controlling the saturation of said auxiliary magnetic circuit in accordance with the current supplied to said load, and a condenser circuit also receiving current from said rectifier for supplementing the saturation effect in said auxiliary magnetic circuit due to the load current, whereby the voltage delivered to said load will remain substantially constant irrespective of variations in the load current.

14. In combination, a magnetizable core comprising a main magnetic circuit and an auxiliary magnetic circuit, a primary and a secondary winding linking said main magnetic circuit, means for supplying said primary winding with alternating current, a rectifier energized from said secondary winding, a load receiving current from said rectifier, a regulating winding energized in accordance with the current supplied to said load for controlling the saturation of said auxiliary magnetic circuit, and means energized from said rectifier and including a condenser for further controlling the saturation of said auxiliary magnetic circuit, whereby the voltage delivered to said load will remain substantially constant irrespective of variations in the load current.

15. In combination, a magnetizable core comprising a main magnetic circuit and an auxiliary magnetic circuit, a primary and a secondary winding linking said main magnetic circuit, means for supplying said primary winding with alternating current, a rectifier energized from said secondary winding, a load receiving current from said rectifier, a first regulating winding energized in accordance with the current supplied to said load for controlling the saturation of said auxiliary magnetic circuit, a second regulating winding energized in accordance with the output voltage of said rectifier for further controlling the saturation of said auxiliary magnetic circuit, and a condenser associated with said second regulating winding for delivering current thereto during portions of each cycle when said output voltage is a minimum, whereby the voltage delivered to said load will remain substantially constant irrespective of variations in the load current.

16. In combination, a magnetizable core comprising a main magnetic circuit and an auxiliary magnetic circuit, a primary and a secondary winding linking said main magnetic circuit, means for supplying said primary winding with alternating current, a rectifier energized from said secondary winding, a load receiving current from said rectifier, a first regulating winding energized in accordance with the current supplied to said load for controlling the saturation of said auxiliary magnetic circuit, a second regulating winding energized in accordance with the output voltage of said rectifier for further controlling the saturation of said auxiliary magnetic circuit, and means associated with said second regulating winding for storing energy during portions of each cycle when said output voltage is a maximum and delivering energy to said second regulating winding during portions of each cycle when said output voltage is a minimum, whereby the voltage delivered to said load will remain substantially constant irrespective of variations in the load current.

17. In combination, a magnetizable core comprising a main magnetic circuit and an auxiliary magnetic circuit, a primary and a secondary winding linking said main magnetic circuit, means for supplying said primary winding with alternating current, a rectifier energized from said secondary winding, a load receiving current from said rectifier, a first regulating winding energized in accordance with the current supplied to said load for controlling the saturation of said auxiliary magnetic circuit, a second regulating winding energized in accordance with the output voltage of said rectifier for further controlling the saturation of said auxiliary magnetic circuit, means associated with said second regulating winding for storing energy during portions of each cycle when said output voltage is a maximum and delivering energy to said second regulating winding during portions of each cycle when said output voltage is a minimum, and an auxiliary source of current connected with the output circuit of said rectifier in such manner as to supply current to said load in the event of failure of the alternating current supply to said primary winding.

18. In combination, a magnetizable core comprising a main magnetic circuit and an auxiliary magnetic circuit having two branches, a primary and a secondary winding linking said main magnetic circuit, means for supplying said primary winding with alternating current, a rectifier energized from said secondary winding, a load receiving current from said rectifier, a regulating winding having a portion linking each branch of said auxiliary magnetic circuit in such manner that any voltage induced in the two portions of said regulating winding by flux due to said primary winding flowing in said auxiliary magnetic circuit will be substantially neutralized, said regulating winding being energized in accordance with the current supplied to said load and acting to vary the saturation of said auxiliary magnetic circuit, and means energized from said rectifier and including a condenser for further varying the saturation of said auxiliary magnetic circuit, whereby the voltage delivered to said load will remain substantially constant irrespective of variations in the load current.

19. In a rectifier system, an A. C. input circuit, a rectifier and a D. C. output circuit, a series arrangement of capacitance and inductance connected across said output circuit and means in said output ciruit for varying the value of said inductance responsive to the current in said output circuit.

20. In a rectifier system, an A. C. input circuit, a rectifier and a D. C. output circuit, a series arrangement of capacitance and inductance connected across said output circuit and means in said output circuit for decreasing the value of said inductance responsive to an increase in the current in said output circuit.

21. In a rectifier system, an A. C. input circuit, a rectifier and a D. C. output circuit, a series arrangement of capacitance and inductance connected across said output circuit and a second inductance in said output circuit arranged so as to decrease the inductive value of said first named inductance responsive to an increase in the current in said output circuit.

22. In a rectifier system, an A. C. input circuit, a rectifier and a D. C. output circuit, a series arrangement of capacitance and inductance connected across said output circuit, a paramagnetic core for said inductance, and a second inductance connected in said output circuit and arranged so as to vary the saturation of said core responsive to current in said output circuit.

23. In a rectifier system, an A. C. input circuit a rectifier and a D. C. output circuit, a series arrangement of capacitance and inductance connected across said output circuit, and a second inductance connected in said output circuit, and a common paramagnetic core for both said inductances.

24. In a rectifier system, an A. C. input circuit, a rectifier and a D. C. output circuit, a series arrangement of capacitance and inductance connected across said output circuit, and a second inductance connected in said output circuit, and a common paramagnetic core for both said inductances, said second inductance thereby being adapted to increase the saturation of said core with an increase in D. C. output current.

25. In a rectifier system, an A. C. input circuit, a rectifier and a D. C. output circuit, a series arrangement of capacitance and inductance connected across said output circuit, and a second inductance connected in said output circuit, and a common closed iron core for both said inductances, said second inductance thereby being adapted to increase the saturation of said core with an increase in D. C. output current whereby the inductance impedance of said first mentioned inductance will be decreased with increase in D. C. output current.

26. A voltage enhancing circuit for pulsating direct current comprising a D. C. circuit supplied with pulsating direct current, a series arrangement of capacitance and inductance connected across said circuit, a second inductance connected in series with said circuit and a paramagnetic core common to both said inductances whereby said second inductance will decrease the inductive impedance of said first mentioned inductance with increasing D. C. flow in said circuit.

27. In a rectifier system, an A. C. input circuit, a rectifier and a D. C. output circuit, a series arrangement of capacitance and inductance connected across said output circuit and means in said output circuit for increasing the effect of said capacitance responsive to an increase in the current in said output circuit.

LINNIE K. HEDDING.

Nov. 8, 1938.   H. A. KROENLEIN   2,136,247
VACUUM CLEANER
Filed Oct. 18, 1933

Inventor:
Henry A. Kroenlein,
by Harry E. Dunham
His Attorney.